(12) United States Patent
Kuo et al.

(10) Patent No.: US 9,535,525 B2
(45) Date of Patent: Jan. 3, 2017

(54) TOUCH-SENSING DISPLAY PANEL AND TOUCH-SENSING SUBSTRATE

(71) Applicant: Au Optronics Corporation, Hsinchu (TW)

(72) Inventors: Jing-Tin Kuo, Taipei (TW); Pei-Yu Chen, Miaoli County (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 2 days.

(21) Appl. No.: 14/571,303

(22) Filed: Dec. 16, 2014

(65) Prior Publication Data

US 2015/0103027 A1 Apr. 16, 2015

Related U.S. Application Data

(63) Continuation of application No. 12/781,824, filed on May 18, 2010, now abandoned.

(30) Foreign Application Priority Data

Dec. 10, 2009 (TW) ................. 98142326 A

(51) Int. Cl.
*G06F 3/041* (2006.01)
*G06F 3/044* (2006.01)

(52) U.S. Cl.
CPC ............. *G06F 3/0412* (2013.01); *G06F 3/044* (2013.01); *G06F 2203/04111* (2013.01)

(58) Field of Classification Search
CPC .............................. G06F 3/044; G06F 3/0412
USPC ................................... 345/173–178
See application file for complete search history.

(56) References Cited

U.S. PATENT DOCUMENTS

| | | | |
|---|---|---|---|
| 2008/0179112 A1* | 7/2008 | Qin et al. ................... | 178/18.06 |
| 2009/0160824 A1* | 6/2009 | Chih-Yung et al. .......... | 345/175 |
| 2010/0079384 A1* | 4/2010 | Grivna ........................... | 345/173 |
| 2011/0007020 A1* | 1/2011 | Hong et al. ................... | 345/174 |

* cited by examiner

*Primary Examiner* — Dennis Joseph
(74) *Attorney, Agent, or Firm* — WPAT, PC; Justin King; Douglas A. Hosack

(57) ABSTRACT

A touch-sensing display panel including a display panel and a touch-sensing unit is provided. The touch-sensing unit includes a plurality of first sensing series and a plurality of second sensing series. The first sensing series are electrically insulated from one another. Each first sensing series includes first touch pads and first bridge lines. Two neighboring first touch pads disposed on a same first sensing series are electrically connected with each other through one of the first bridge lines. The second sensing series are electrically insulated from one another. Each second sensing series includes second touch pads and second bridge lines. Two neighboring second touch pads disposed on a same second sensing series are electrically connected with each other through two second bridge lines which are at least 140 micrometers apart. A touch-sensing substrate is also provided.

15 Claims, 5 Drawing Sheets

TOUCH-SENSING DISPLAY PANEL AND TOUCH-SENSING SUBSTRATE

CROSS-REFERENCE TO RELATED APPLICATION

This is a continuation application of and claims the priority benefit of patent application Ser. No. 12/781,824, filed on May 18, 2010, now pending, which claims the priority benefit of Taiwan application serial No. 98142326, filed on Dec. 10, 2009. The entirety of each of the above-mentioned patent applications is hereby incorporated by reference herein and made a part of specification.

BACKGROUND OF THE INVENTION

Field of the Invention

The present invention relates to a flat panel display. More particularly, the present invention relates to a touch sensing display panel.

Description of Related Art

Based on different sensing types, a touch-sensing panel can be generally categorized into a resistance touch-sensing panel, a capacitive touch-sensing panel, an optical touch-sensing panel, an acoustic-wave touch-sensing panel and an electromagnetic touch-sensing panel. The capacitive touch sensing panel is characterized by short response speed, favorable reliability, satisfactory durability, and so on. Therefore, the capacitive touch-sensing panel is widely used in the electronic products. According to structural and manufacturing differences, the capacitive touch sensing-panel can be further classified into an Added-on type touch sensing panel and an On-cell/In-cell type touch-sensing panel. In the process for manufacturing the Added-on type capacitive touch-sensing panel, the sensing series are formed on an auxiliary substrate, and then the auxiliary substrate having the sensing series formed thereon is adhered to an outer surface of a display. Apparently, the Added-on type touch-sensing panel possesses a certain thickness. Comparing with the Added-on type touch-sensing panel, the On-cell/In-cell type touch-sensing panel is more favorable for the slimness and lightness of the monitor.

Not only the On-cell/In-cell type touch-sensing panel but also the Added-on touch-sensing panel confronts the problems of the poor yield during the production or the decreasing of the yield due to the electrostatic discharge. For instance, in the conventional method for manufacturing the On-cell/In-cell touch-sensing panel, the touch-sensing circuit is usually manufactured on one surface of the substrate before the color filter thin film is formed on the other surface of the substrate. At the time the color filter thin film is formed, the touch-sensing circuit is easily broken due to the poor yield during the production or is damaged due to the electrostatic discharge. In addition, when the user's finger touches the On-cell/In-cell type touch-sensing panel and the Added-on touch-sensing panel, the electrostatic discharge possibly happens and leads to the damage of the touch-sensing circuit.

In the conventional capacitive touch-sensing panel, the metal bridge lines disposed on the crossover region, where the X sensing series intersect the Y sensing series, are used to couple the neighboring touch pads to each other to avoid the short circuit happening on the X sensing series and the Y sensing series around the crossover region. For instance, the two neighboring touch pads in the X sensing series or the Y sensing series are electrically connected to each other through a metal bridge line. When the electrostatic discharge happens, the metal bridge line may possibly fuse which leads to the X sensing series or the Y sensing series cannot be operated normally. Hence, the conventional technique (such as the technique disclosed in R.O.C. patent No. TW M344544) provides a design in which the two neighboring touch pads are electrically connected to each other through two parallel metal bridge lines. The aforementioned design can improve the issue of the decreasing of the yield due to the electrostatic discharge. However, when the two metal bridge lines are too close to each other, the visual effect is seriously affected.

SUMMARY OF THE INVENTION

The present invention provides a touch-sensing display panel and a touch-sensing substrate with a better visual effect due to the bridge line hard to be perceived by the user.

The present invention provides a touch-sensing display panel including a display panel and a touch-sensing unit. The touch-sensing unit is disposed on the display panel and the touch-sensing unit comprises a plurality of first sensing series and a plurality of second sensing series. The first sensing series are electrically insulated from one another, and each of the first sensing series includes a plurality of first touch pads and a plurality of first bridge lines, and two neighboring first touch pads disposed on the same first sensing series are electrically connected with each other through one of the first bridge lines. The second sensing series are electrically insulated from one another, and each of the second sensing series includes a plurality of second touch pads and a plurality of second bridge lines, and two neighboring second touch pads disposed on the same second sensing series are electrically connected with each other through at least two second bridge lines which are at least 140 micrometers apart.

The present invention provides a touch-sensing substrate including a substrate, a plurality of first sensing series and a plurality of second sensing series. The first sensing series are electrically insulated from one another, and each of the first sensing series includes a plurality of first touch pads and a plurality of first bridge lines, and two neighboring first touch pads disposed on the same first sensing series are electrically connected with each other through one of the first bridge lines. The second sensing series are electrically insulated from one another, and each of the second sensing series includes a plurality of second touch pads and a plurality of second bridge lines, and two neighboring second touch pads disposed on the same second sensing series are electrically connected with each other through at least two second bridge lines which are at least 140 micrometers apart.

In one embodiment of the present invention, the aforementioned touch-sensing unit is disposed on an outer surface of the display panel.

In one embodiment of the present invention, the touch-sensing may further include an auxiliary substrate disposed between the touch-sensing unit and the display panel.

In one embodiment of the present invention, the aforementioned touch-sensing unit is built in the display panel.

In one embodiment of the present invention, the material of the first touch pads is as same as the material of the first bridge lines.

In one embodiment of the present invention, the material of the first touch pads and the material of the first bridge lines include transparent conductive material.

In one embodiment of the present invention, the material of the first touch pads, the material of the first bridge lines and the material of the second touch pads are the same.

In one embodiment of the present invention, the material of the first touch pads, the material of the first bridge lines and the material of the second touch pads include transparent conductive material and the material of the second bridge lines includes metal.

In one embodiment of the present invention, in the same second sensing series, at least two second bridge lines connected to two neighboring second touch pads are about 400~600 micrometers apart.

In one embodiment of the present invention, in the same second sensing series, at least two second bridge lines connected to two neighboring second touch pads are about 600~3000 micrometers apart.

In one embodiment of the present invention, in the same second sensing series, at least two second bridge lines connected to two neighboring second touch pads are about 140~3000 micrometers apart.

In one embodiment of the present invention, each of the second touch pads has at least two branch portions and each of the branch portions is connected with one of the second bridge lines respectively.

In one embodiment of the present invention, each of the first touch pads has a plurality of openings and each of the branch portions extends into one of the openings respectively.

In one embodiment of the present invention, a gap is disposed between each of the branch portions and the corresponding first touch pad and the dimension of the gap is about 10~100 micrometers.

In one embodiment of the present invention, the touch-sensing unit further comprises a plurality of floating conductive patterns disposed between the first sensing series and the branch portions.

In one embodiment of the present invention, the touch-sensing unit further comprises a plurality of dielectric patterns, and each of the dielectric patterns is disposed under one of the second bridge lines respectively so that each of the second bridge lines is electrically insulated from the first sensing series.

In one embodiment of the present invention, the touch-sensing unit further comprises a plurality of floating conductive patterns disposed between the first sensing series and the second sensing series.

In one embodiment of the present invention, the display panel comprises a plurality of sub-pixels arranged in an array, and, in the same second sensing series, at least two first bridge lines connected to two neighboring second touch pads are arranged apart with a distance which is an integral multiple of the length or the width of each of the sub-pixels.

Accordingly, since, in the same second sensing series, the two neighboring second touch pads are connected to each other through at least two second bridge lines which are at least 140 micrometers apart, the bridge lines in the touch-sensing display panel and the touch-sensing substrate are hardly perceived by the user and the visual effect is improved.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
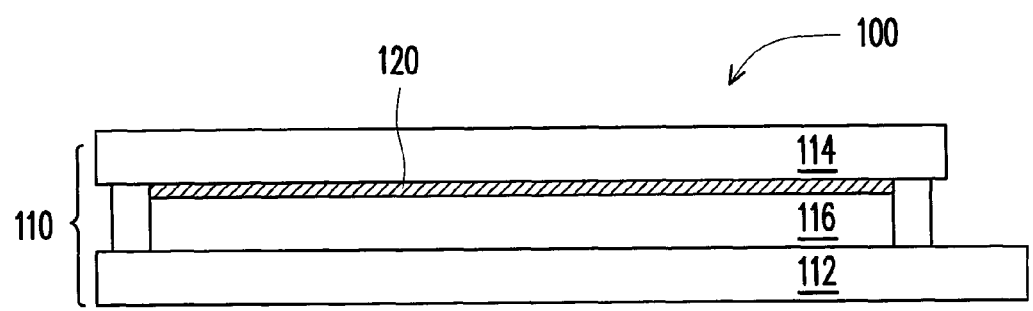
FIGS. 1A through 1C are schematic views showing various touch-sensing display panels according to one embodiment of the present invention.
Figure 1B:
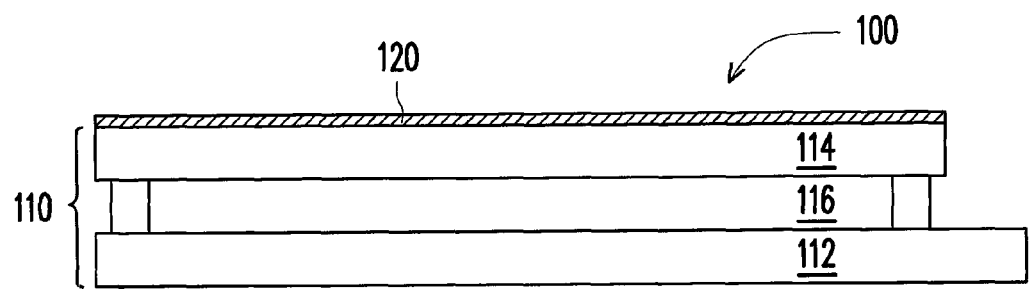
Figure 1C:
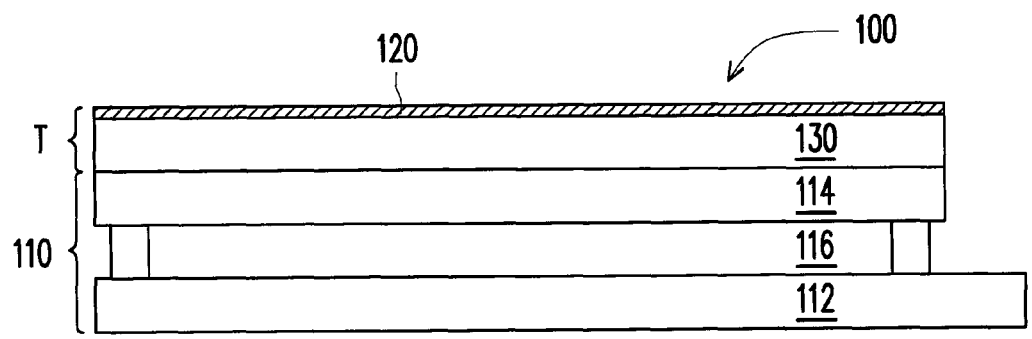

FIGS. 1A through 1C are schematic views showing various touch-sensing display panels according to one embodiment of the present invention. As shown in FIG. 1A, a touch-sensing display panel 100 of the present embodiment includes a display panel 110 and a touch-sensing unit 120 disposed on the display panel 110. In the present embodiment, the touch-sensing unit 120 can be, for example, built in the display panel 110. For instance, the display panel 110 can be a liquid crystal display panel including a thin film transistor (TFT) array substrate 112, a color filter substrate 114 and a liquid crystal layer 116 located between the TFT array substrate 112 and the color filter substrate 114, and the touch-sensing unit 120 is disposed on the inner surface of the color filter substrate 114. In other words, the touch-sensing unit 120 is disposed between the color filter substrate 114 and the liquid crystal layer 116, the design of which is the so-called In-cell design. The display panel 110 can also be an organic light emitting display panel, an electrophoretic display panel or a plasma display panel.

The touch-sensing unit 120 not only can be built in the display panel but also can be assembled with the display panel in other manners such as those shown in FIG. 1B and FIG. 1C. As shown in FIG. 1B, the touch-sensing unit 120 can be disposed on the outer surface of the color filter substrate, the design of which is the so-called On-cell design. Moreover, the touch-sensing unit 120 can be formed on a substrate (e.g. the auxiliary substrate 130) and then the substrate 130 having the touch-sensing unit 120 formed thereon is adhered to the outer surface of the color filter substrate 114 (as shown in FIG. 1C), the design of which is the so-called Added-on design. It should be noticed that the substrate 130 (i.e. the auxiliary substrate 130) shown in FIG. 1C and the touch-sensing unit 120 together form a touch-sensing substrate T of the present embodiment. According to the description above, the touch-sensing unit 120 of the present invention can be formed on the color filter substrate 114, the thin film transistor array substrate 112 or the auxiliary substrate 130, and the present invention is not limited thereto.

A detailed description is provided hereinafter for various types of the touch-sensing unit 120 in the present embodiment of the invention.

Figure 2A:
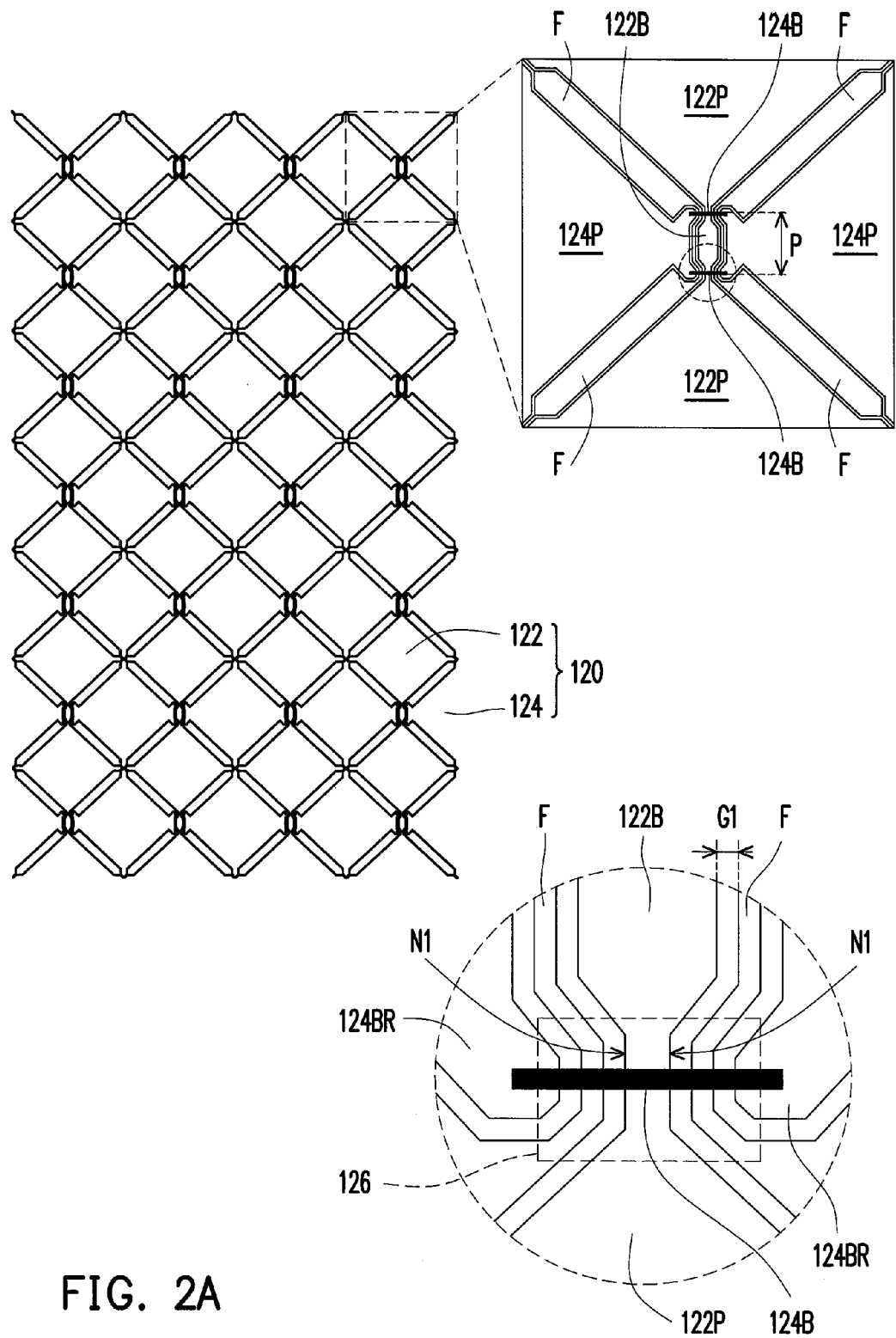
FIGS. 2A through 2C are schematic top views showing touch-sensing units in different embodiments of the present invention.
Figure 2B:
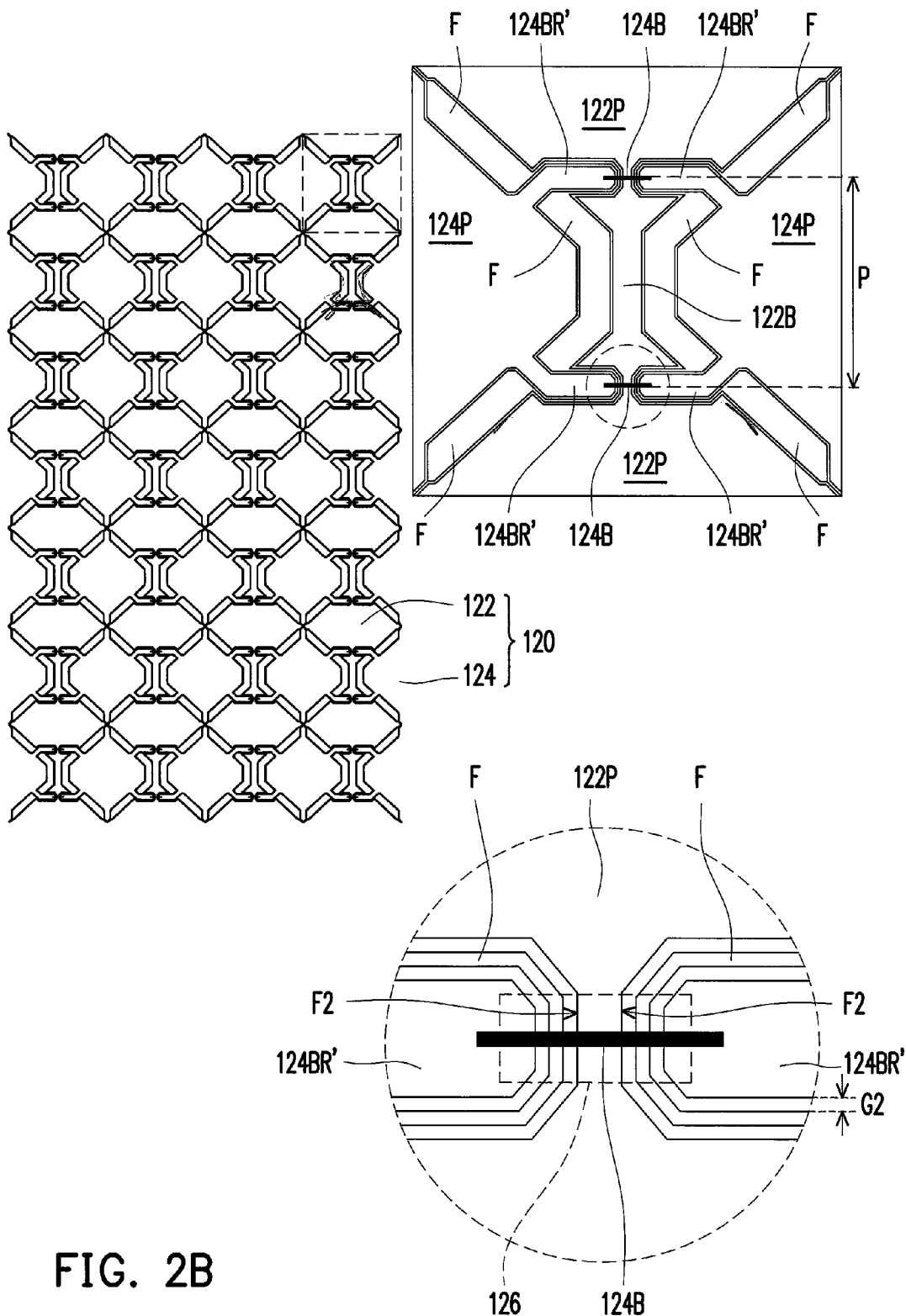
Figure 2C:
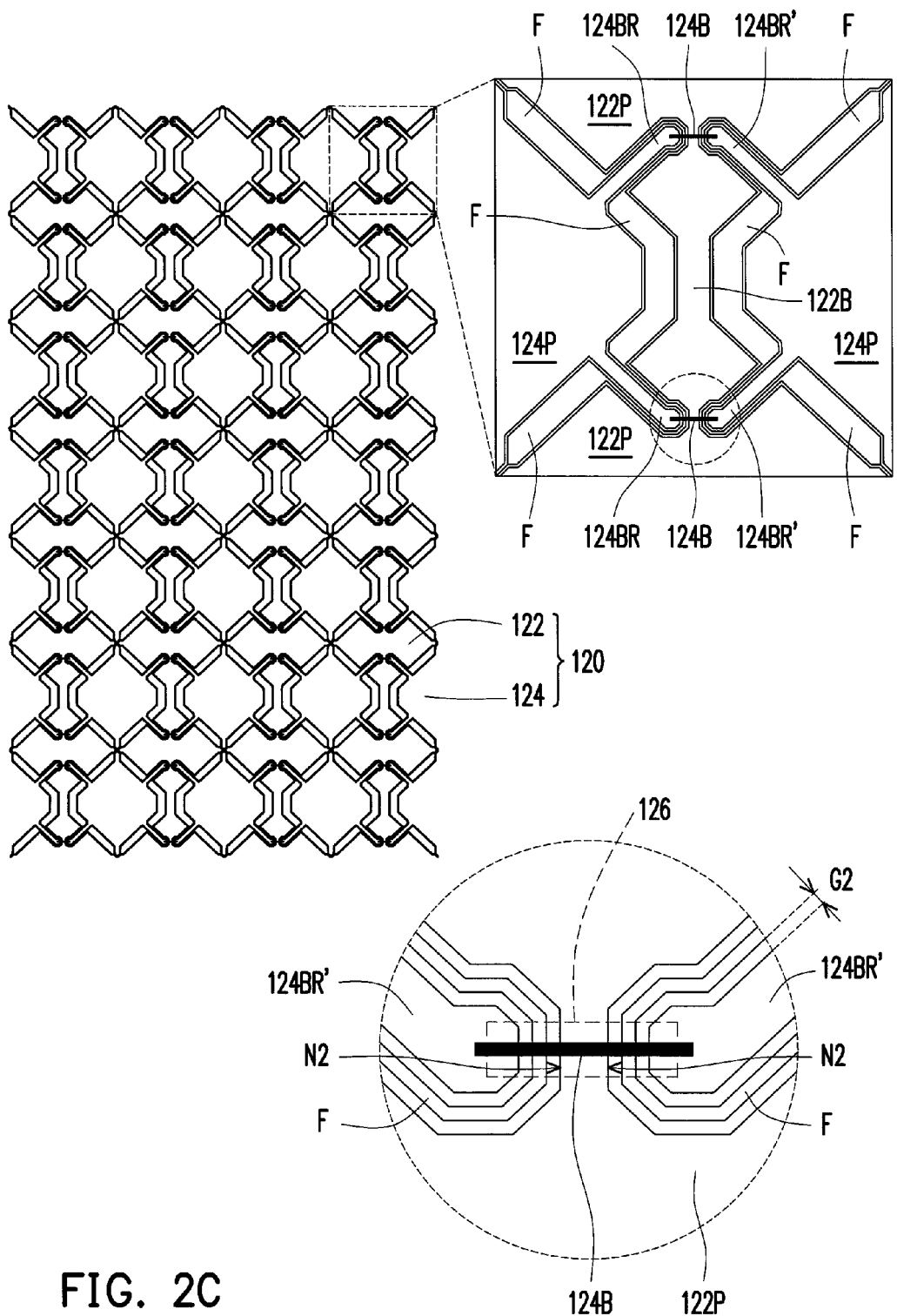

FIGS. 2A through 2C are schematic top views showing touch-sensing units in different embodiments of the present invention. As shown in FIG. 2A, the touch-sensing unit 120 of the present embodiment includes a plurality of first sensing series 122 and a plurality of second sensing series 124. The first sensing series 122 are electrically insulated from one another, and each of the first sensing series 122 includes a plurality of first touch pads 122P serially connected together and a plurality of first bridge lines 122B, and two neighboring first touch pads 122P disposed on the same first sensing series 122 are electrically connected with each other through one of the first bridge lines 122B. The second sensing series 124 are electrically insulated from one another, and each of the second sensing series 124 includes a plurality of second touch pads 124P serially connected together and a plurality of second bridge lines 124B, and two neighboring second touch pads 124P disposed on the same second sensing series 124 are electrically connected with each other through at least two second bridge lines 124B which are apart from each other by a distance P at least 140 micrometers. The distance P between the at least two second bridge lines 124B is larger than 140 micrometers and smaller than 3000 micrometers. In the present embodiment, the aforementioned distance P is about 400~600 micrometers. Because the distance P is larger than 140 micrometers, the second bridge lines 124B are hardly perceived and the visual effect is improved.

As shown in FIG. 2A, each of the second touch pads 124P has at least two branch portions 124BR, and each of the branch portions 124BR is connected to one of the second bridge lines 124B, and the first bridge line 122B around the crossover region, where the first sensing series 122 intersect the second sensing series 124 respectively, has a plurality of openings N1, and each of the branch portions 124BR extends into one of the openings N1. In one embodiment of the present invention, the material of the first touch pads 122P is as same as the material of the first bridge lines 122B. In other words, the first touch pads 122P and the first bridge lines 122b belong to the same patterned thin film, and the material of the first touch pads 122P and the material of the first bridge lines 122B are the transparent conductive materials such as indium-tin-oxide (ITO) or indium-zinc-oxide (IZO). In other embodiments of the present invention, the material of the first touch pads 122P, the material of the first bridge lines 122B and the material of the second touch pads 124P can be the same. In other words, the first touch pads 122P, the first bridge lines 122b and the second touch pads 124P belong to the same patterned thin film, and the material of the first touch pads 122P, the material of the first bridge lines 122B and the material of the second touch pads 124P are the transparent conductive materials such as indium-tin-oxide (ITO) or indium-zinc-oxide (IZO). Furthermore, the material of the second bridge lines 124B can be, for example, metal.

In order to effectively avoid the short circuit happening on the first sensing series 122 and the second sensing series 124, the touch-sensing unit 120 of the present embodiment further comprises a plurality of dielectric patterns 126, and each of the dielectric patterns 126 is disposed under one of the second bridge lines 124B respectively so that each of the second bridge lines 124B is electrically insulated from the first sensing series 122. Furthermore, in the present embodiment, the touch-sensing unit 120 further comprises a plurality of floating conductive patterns F disposed between the first sensing series 122 and the branch portions 124BR to improve the cross-talk phenomenon between the first sensing series 122 and the branch portions 124BR. For instance, there is a gap G1 disposed between the floating conductive patterns and the corresponding first touch pad 122P, and the dimension of the gap G1 is about 10~100 micrometers.

As shown in FIG. 2B and FIG. 2C, the touch-sensing units 120 shown in FIG. 2B and FIG. 2C respectively are similar to the touch-sensing unit 120 shown in FIG. 2A. The major difference therebetween is the distance P in the touch-sensing units shown in FIG. 2B and FIG. 2C respectively is relatively larger and is about 600~3000 micrometers (as shown in FIG. 2B) or is about 2000~3000 micrometers (as shown in FIG. 2C).

As shown in FIG. 2B and FIG. 2C, in the present embodiment, each of the second touch pads 124P has at least two branch portions 124BR' and each of the branch portions 124BR' is connected with one of the second bridge lines 124B respectively. Moreover, each of the first touch pads 122P has a plurality of openings N2 and each of the branch portions 124BR' extends into one of the openings N2 respectively.

In order to effectively avoid the short circuit happening on the first sensing series 122 and the second sensing series 124, the touch-sensing unit 120 of the present embodiment further comprises a plurality of dielectric patterns 126, and each of the dielectric patterns 126 is disposed under one of the second bridge lines 124B respectively so that each of the second bridge lines 124B is electrically insulated from the first sensing series 122. Further, in the present embodiment, the touch-sensing unit 120 further comprises a plurality of floating conductive patterns F disposed between the first sensing series 122 and the branch portions 124BR'. For instance, there is a gap G2 disposed between each of the branch portions 124BR' and the corresponding first touch pad 122P, and the dimension of the gap G2 is about 10~100 micrometers.

Figure 3:
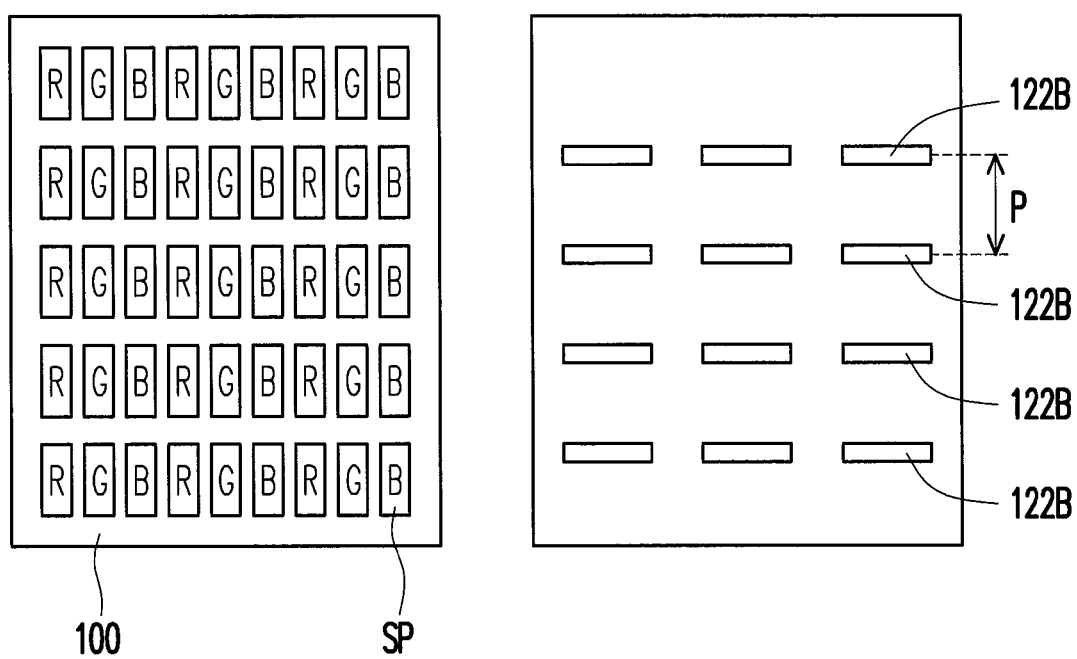
FIG. 3 is a schematic top view showing a touch-sensing display panel according to one embodiment of the present invention.

FIG. 3 is a schematic top view showing a touch-sensing display panel according to one embodiment of the present invention. As shown in FIGS. 2A through 2C together with FIG. 3, the display panel 100 of the present embodiment comprises a plurality of sub-pixels SP arranged in an array, and, in the same second sensing series 124, at least two first bridge lines 122B connected to two neighboring second touch pads 124P are arranged apart with a distance P which is an integral multiple of the length or the width of each of the sub-pixels SP (as shown in FIG. 3). For instance, the distance P can be, for example, an integral multiple of the length of each of the sub-pixels SP.

Accordingly, since, in the same second sensing series, the two neighboring second touch pads are connected to each other through at least two second bridge lines which are at least 140 micrometers apart, the bridge lines in the touch-sensing display panel and the touch-sensing substrate are hardly perceived by the user and the visual effect is improved.

What is claimed is:

1. A touch-sensing display panel, comprising:
a touch-sensing unit comprising:
a first sensing series, comprising:
a plurality of first touch pads;
a plurality of first bridge lines; and
a plurality of neck portions,
wherein two neighboring first touch pads are electrically connected through a first neck portion, one of the first bridge lines, and a second neck portion; and
a second sensing series, comprising:
a plurality of second touch pads, each comprising at least two branch portions that each extends toward one of the neck portions; and
at least two second bridge lines, each directly connecting to one of the at least two branch portions;
wherein two neighboring second touch pads are electrically connected with each other through at the at least two of the second bridge lines, wherein said one of the first bridge lines has a first width, said first neck portion and said second portion have a second width, and said first width is larger than said second width.

2. The touch-sensing display panel of claim 1, wherein said one of the first bridge lines is contained within said at least two of the second bridge lines and said two neighboring second touch pads.

3. The touch-sensing display panel of claim 2, wherein said at least two of the second bridge lines are 140 to 3000 micrometers apart.

4. The touch-sensing display panel of claim 1, further comprising:
   a floating conductive pattern, disposed between each of said two branch portions and said first sensing series.

5. The touch-sensing display panel of claim 4, further comprising:
   a first gap between said first sensing series and said conductive floating pattern.

6. The touch-sensing display panel of claim 1, further comprising:
   a plurality of dielectric patterns, each disposed above said first series and underneath one of said plurality of second bridge lines, respectively, to electrically insulate said one of said plurality of second bridge lines from said first sensing series.

7. A touch-sensing substrate, comprising:
   a first sensing series, comprising:
      a plurality of first touch pads;
      a plurality of first bridge lines; and
      a plurality of neck portions,
      wherein two neighboring first touch pads are electrically connected through a first neck portion, one of the first bridge lines, and a second neck portion; and
   a second sensing series, comprising:
      a plurality of second touch pads, each comprising at least two branch portions that each extends toward one of the neck portions; and
      at least two second bridge lines, each directly connected to one of the at least two branch portions;
      wherein two neighboring second touch pads are electrically connected with each other through at least two of the second bridge lines,
      wherein said one of the first bridge lines has a first width, said first neck portion and said second portion have a second width, and said first width is larger than said second width.

8. The touch-sensing substrate of claim 7, wherein said one of the first bridge lines is contained within said at least two of the second bridge lines and said two neighboring second touch pads.

9. The touch-sensing substrate of claim 8, wherein said at least two of the second bridge lines are 140 to 3000 micrometers apart.

10. The touch-sensing substrate of claim 7, further comprising:
    a floating conductive pattern, disposed between each of said two branch portions and said first sensing series.

11. The touch-sensing substrate of claim 10, further comprising:
    a first gap between said first sensing series and said conductive floating pattern.

12. The touch-sensing substrate of claim 7, further comprising:
    a color filter substrate;
    a thin film transistor array substrate; and
    an auxiliary substrate.

13. The touch-sensing substrate of claim 7, further comprising:
    a plurality of dielectric patterns, each disposed above said first series and underneath one of said plurality of second bridge lines, respectively, to electrically insulate said one of said plurality of second bridge lines from said first sensing series.

14. The touch-sensing substrate of claim 7, wherein said plurality of first touch pads are made of a transparent conductive material.

15. The touch-sensing substrate of claim 14, wherein said transparent conductive material is indium-tin-oxide or indium-zinc-oxide.

* * * * *